(12) United States Patent
Jang

(10) Patent No.: US 12,191,565 B2
(45) Date of Patent: Jan. 7, 2025

(54) MAGNETIC SHIELDING SHEET FOR ANTENNA MODULE AND ANTENNA MODULE INCLUDING THE SAME

(71) Applicant: AMOSENSE CO., LTD, Cheonan-si (KR)

(72) Inventor: Kil Jae Jang, Cheonan-si (KR)

(73) Assignee: AMOSENSE CO., LTD, Cheonan-si (KR)

( * ) Notice: Subject to any disclaimer, the term of this patent is extended or adjusted under 35 U.S.C. 154(b) by 137 days.

(21) Appl. No.: 18/250,956

(22) PCT Filed: Oct. 22, 2021

(86) PCT No.: PCT/KR2021/014872
§ 371 (c)(1),
(2) Date: Apr. 27, 2023

(87) PCT Pub. No.: WO2022/092709
PCT Pub. Date: May 5, 2022

(65) Prior Publication Data
US 2023/0411841 A1    Dec. 21, 2023

(30) Foreign Application Priority Data

Oct. 28, 2020 (KR) .................. 10-2020-0140997

(51) Int. Cl.
*H01Q 1/52* (2006.01)
(52) U.S. Cl.
CPC .................... *H01Q 1/526* (2013.01)
(58) Field of Classification Search
CPC ...................................................... H01Q 1/526
See application file for complete search history.

(56) References Cited

U.S. PATENT DOCUMENTS

2013/0119927 A1    5/2013   Partovi

FOREIGN PATENT DOCUMENTS

| KR | 101629653 B1 | 6/2016 |
| KR | 20160105079 A | 9/2016 |
| KR | 20160135677 A | 11/2016 |
| KR | 101795545 B1 | 11/2017 |
| KR | 20190030671 A | 3/2019 |

OTHER PUBLICATIONS

International Search Report for PCT/KR2021/014872 by the Korean Intellectual Property Office dated Feb. 9, 2022.

*Primary Examiner* — Graham P Smith
(74) *Attorney, Agent, or Firm* — BROADVIEW IP LAW, PC

(57) ABSTRACT

Disclosed is an magnetic field shielding sheet for an antenna module is applied to an antenna module comprising an antenna unit operating in a predetermined frequency band and a magnet for position alignment, and comprises: a main shielding sheet made of a magnetic material so as to be able to shield a magnetic field generated from the antenna unit; and at least one magnetic saturation-prevention member stacked on one side of the main shielding sheet so as to be able to prevent magnetic saturation of the main shielding sheet by inducing a direct magnetic field generated from the magnet, wherein the magnetic saturation-prevention member is provided in a number corresponding to the number of magnets provided in the antenna module and is positioned on one side of the main shielding sheet so as to be positioned at a position corresponding to the magnets provided in the antenna module.

17 Claims, 4 Drawing Sheets

MAGNETIC SHIELDING SHEET FOR ANTENNA MODULE AND ANTENNA MODULE INCLUDING THE SAME

CROSS REFERENCE TO RELATED APPLICATION

This application is the national phase entry of International Application No. PCT/KR2021/014872, filed on Oct. 22, 2021, which is based upon and claims priority to Korean Patent Applications No. 10-2020-0140997, filed on Oct. 28, 2020. The entire contents of which are incorporated herein by reference.

TECHNICAL FIELD

The present invention relates to a magnetic field shielding sheet for an antenna module and an antenna module including the same.

BACKGROUND ART

Near field communication (NFC) and wireless power transmission are essentially contactless transmission methods.

This non-contact transmission method is implemented through an antenna that transmits or receives a magnetic field, and a magnetic field shielding sheet which is disposed on one surface of the antenna to smoothly transmit or receive a magnetic field.

In general, a sheet made of a magnetic material such as an amorphous ribbon sheet, a ferrite sheet or a polymer sheet is used as the magnetic field shielding sheet.

Meanwhile, in the non-contact transmission method, smooth transmission efficiency is ensured when the receiving module and the transmitting module are aligned with each other. For example, wireless power transmission exhibits high transmission efficiency in a state where the wireless power receiving module and the wireless power transmitting module are aligned with each other.

Accordingly, the method for smoothly aligning the wireless power receiving module and the wireless power transmitting module by respectively including a magnet for position alignment in the wireless power receiving module and the wireless power transmitting module has been proposed.

However, the magnets included in each of the wireless power receiving module and the wireless power transmitting module generate a DC magnetic field, and there is a problem in that the DC magnetic field generated from the magnet magnetically saturates the magnetic field shielding sheet for improving the performance of an antenna.

In order to solve this problem, when a magnetic field shielding sheet having a thick thickness is used, the overall thickness of the wireless power receiving module or the wireless power transmitting module is increased.

Therefore, there is a need for a method which is capable of minimizing the influence of the DC magnetic field generated from the magnet without increasing the overall thickness.

SUMMARY OF THE INVENTION

The present invention is directed to providing a magnetic field shielding sheet for an antenna module which is capable of preventing magnetic saturation due to a DC magnetic field generated from a magnet, and an antenna module including the same.

One aspect of the present invention provides a magnetic field shielding sheet for an antenna module which is applied to an antenna module includes an antenna unit operating in a predetermined frequency band and a magnet for position alignment, including a main shielding sheet made of a magnetic material so as to shield a magnetic field generated from the antenna unit; and at least one magnetic saturation-prevention member which is stacked on one side of the main shielding sheet so as to prevent magnetic saturation of the main shielding sheet by inducing a direct magnetic field generated from the magnet, wherein the magnetic saturation-prevention member is provided in a number corresponding to the number of magnets provided in the antenna module and is disposed so as to be positioned at a position corresponding to the magnets provided in the antenna module.

In addition, the magnetic saturation-prevention member may be provided to have a cross-sectional area which is larger than the cross-sectional area of the magnet.

In addition, the thickness of the magnetic saturation-prevention member may be provided to have a thickness of ½ or less with respect to the thickness of the main shielding sheet.

In addition, the magnetic saturation-prevention member may be made of a material having a saturation magnetic flux density of 1.2 Tesla or more. For example, the magnetic saturation-prevention member may be a ribbon sheet of an amorphous alloy or a nano-crystalline alloy. In this case, the magnetic saturation-prevention member may be a multi-layer sheet in which the ribbon sheet is stacked in multiple layers.

In addition, the magnetic field shielding sheet for an antenna module may further include a first protective film and a second protective film which are attached to the main shielding sheet so as to surround an exposed surface of the main shielding sheet, and any one of the first protective film and the second protective film may be attached to the main shielding sheet so as to surround one surface of the main shielding sheet and an exposed surface of the magnetic saturation-prevention member which is laminated on one surface of the main shielding sheet.

Meanwhile, the present invention provides an antenna module, including an antenna unit including a circuit board, at least one antenna which is formed in a pattern on at least one surface of the circuit board and at least one magnet which is disposed on one surface of the circuit board; and a magnetic field shielding sheet which is disposed on one surface of the antenna unit so as to shield a magnetic field generated from the at least one antenna, wherein the magnetic field shielding sheet is the above-described magnetic field shielding sheet for an antenna module.

In addition, the antenna may include at least one of an antenna for wireless power transfer, an NFC antenna and an MST antenna.

In addition, the magnetic field shielding sheet may be attached to one surface of the circuit board such that the magnetic saturation-prevention member is disposed between the circuit board and the main shielding sheet.

In addition, the magnet may be provided in a pair to have different polarities at positions corresponding to the magnetic saturation-prevention member.

According to the present invention, even when the antenna unit includes a magnet for position alignment, it is possible to prevent the main shielding sheet from being magnetically saturated by the DC magnetic field generated from the magnet. Through this, the magnetic field shielding sheet for an antenna module according to the present invention can minimize the influence of the DC magnetic field generated from the magnet while maintaining the same thickness as in the related art.

DETAILED DESCRIPTION OF THE INVENTION

Figure 1:
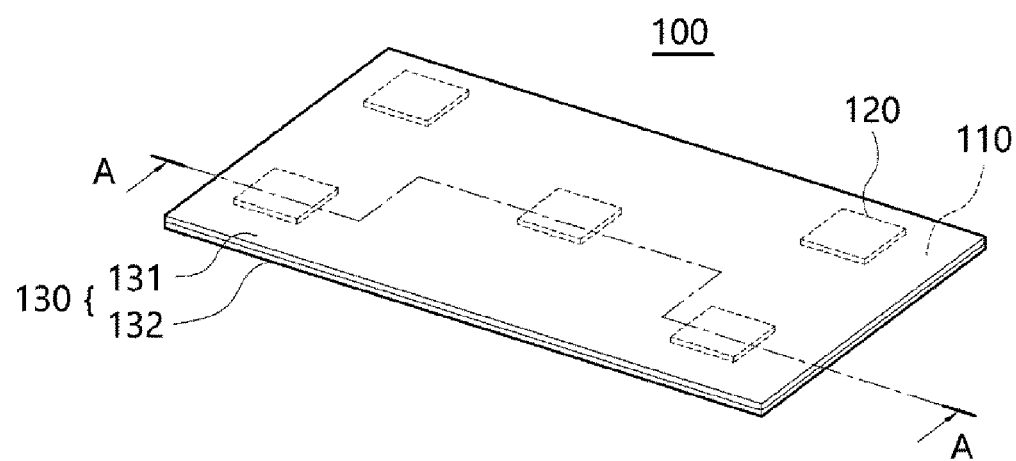
FIG. 1 is a view showing the magnetic field shielding sheet for an antenna module according to one embodiment of the present invention.

Hereinafter, with reference to the accompanying drawings, the exemplary embodiments of the present invention will be described in detail so that those of ordinary skill in the art can easily practice the present invention. The present invention may be embodied in many different forms and is not limited to the exemplary embodiments described herein. In order to clearly describe the present invention in the drawings, parts that are irrelevant to the description are omitted, and the same reference numerals are assigned to the same or similar elements throughout the specification.

As illustrated in FIG. 1, the magnetic field shielding sheet 100 for an antenna module according to one embodiment of the present invention includes a main shielding sheet 110, a magnetic saturation-prevention member 120 and a protective film 130.

Such a magnetic field shielding sheet 100 for an antenna module may be applied to antenna units 210, 210', 210" including at least one magnet 218 for position alignment as illustrated in FIGS. 4 to 7.

That is, when the magnetic field shielding sheet 100 for an antenna module according to one embodiment of the present invention constitutes an antenna module 200 together with antenna units 210, 210', 210", it may be disposed on one surface of the antenna units 210, 210', 210", and the magnetic saturation-prevention member 120 may be disposed at a position corresponding to the magnets 218, 218' provided in the antenna units 210, 210', 210".

Herein, the antenna units 210, 210', 210" may include a circuit board 212, at least one antenna 214, 216 which is formed in a pattern on at least one surface of the circuit board 212, and a magnet 218 for position alignment which is disposed on one surface of the circuit board 212.

In this case, the at least one antenna 214, 216 may perform a predetermined function in a non-contact manner by using a magnetic field in a predetermined frequency band, and the magnet 218 for position alignment may be disposed on one surface of the circuit board 212 so as not to overlap with the at least one antenna 214, 216.

In addition, the at least one antenna 214, 216 may be provided with any one of an antenna for wireless power transfer for performing wireless power transmission, an NFC antenna for wireless communication and an MST antenna for magnetic security payment, or it may be configured by including two or more of the above-described antenna for wireless power transfer, NFC antenna and MST antenna.

Moreover, the antenna module 200 may be implemented as a wireless power transfer module, an NFC module, an MST module and the like, depending on the type of antennas 214, 216 constituting the antenna units 210, 210', 210".

The main shielding sheet 110 may be made of a material having magnetism to shield the magnetic field generated by the antenna units 210, 210', 210".

For example, the main shielding sheet 110 may be composed of a ribbon sheet of an amorphous alloy or a nano-crystalline alloy, may be composed of a ferrite sheet or a polymer sheet, or may be composed in a mutually combined form of the ribbon sheet, ferrite sheet and polymer sheet.

In addition, the main shielding sheet 110 may be a multi-layer sheet in which a plurality of sheets are stacked in multiple layers via an adhesive layer, and the main shielding sheet 110 may be composed of a sheet which is separated into a plurality of pieces to increase overall resistance to suppress the generation of eddy current or to improve flexibility.

Figure 2:
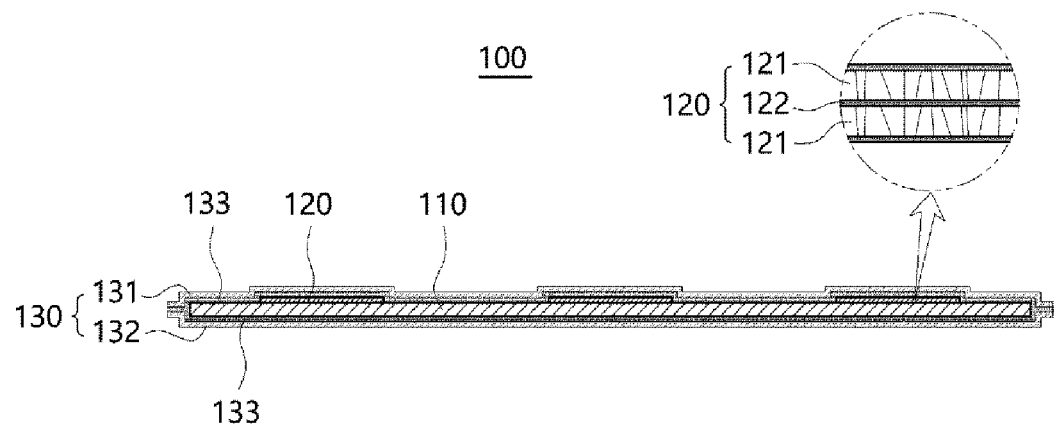
FIG. 2 is a sectional view in the A-A direction of FIG. 1.

As a non-limiting example, the main shielding sheet 110 may be a sheet composed of a single layer of the ribbon sheet, ferrite sheet, polymer sheet and the like as illustrated in FIG. 2.

Figure 3:
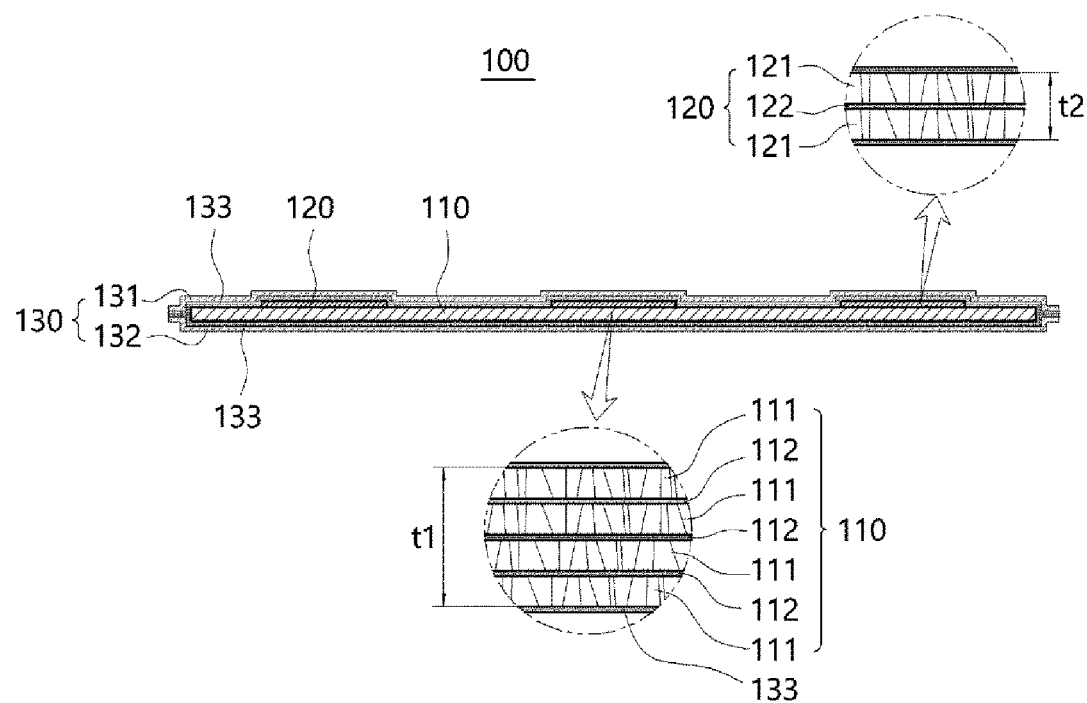
FIG. 3 is a cross-sectional view in the A-A direction of FIG. 1, showing another form of the main shielding sheet.

Alternatively, the main shielding sheet 110 may be composed of a ribbon sheet 111 of an amorphous alloy or nano-crystalline alloy as illustrated in FIG. 3, or it may be a multi-layer sheet in which a plurality of ribbon sheets 111 are stacked in multiple layers via an adhesive layer 112, and each ribbon sheet 111 constituting the multi-layer sheet may be a sheet which is separately formed into a plurality of pieces.

However, the material of the main shielding sheet 110 is not limited thereto, and any known shielding sheet commonly used to shield a magnetic field may be applied thereto. Moreover, the main shielding sheet 110 may include at least one penetrating portion (not illustrated) that is formed through a predetermined length or a predetermined area so as to reduce the effect of eddy current while implementing high magnetic permeability.

When the antenna units 210, 210', 210" include a magnet 218 for position alignment, the magnetic saturation-prevention member 120 may induce a DC magnetic field generated from the magnet 218 to prevent magnetic saturation of the main shielding sheet 110 by the DC magnetic field.

To this end, the magnetic saturation-prevention member 120 may be laminated on one surface of the main shielding sheet 110, and it may be made of a material having magnetism to induce a DC magnetic field generated from the magnet 218.

Moreover, the magnetic saturation-prevention member 120 may be provided to have a larger area than the cross-sectional area of the magnet 218.

For example, the magnetic saturation-prevention member 120 may be laminated on one surface of the main shielding sheet 110 so as to be positioned at a position corresponding to the magnet 218 included in the antenna units 210, 210', 210", or the magnetic saturation-prevention member 120 may be provided to correspond one-to-one to the magnets 218 included in the antenna units 210, 210', 210", and the magnetic saturation-prevention member 120 may be provided to have a larger area than the cross-sectional area of the corresponding magnet 218.

Specifically, the magnetic saturation-prevention member 120 may be disposed to correspond one-to-one to the magnet 218 which is disposed on one surface of the circuit board 212 between the circuit board 212 and the main shielding sheet 110 constituting the antenna units 210, 210', 210".

That is, the magnetic saturation-prevention member 120 and the magnet 218 may be respectively disposed on both surfaces of the circuit board 212 constituting the antenna units 210, 210', 210", and the magnetic saturation-prevention member 120 may be laminated on one surface of the main shielding sheet 110 so as to be positioned directly under the magnet 218, and the magnetic saturation-prevention member 120 may be provided to have a larger cross-sectional area than the magnet 218.

Figure 4:
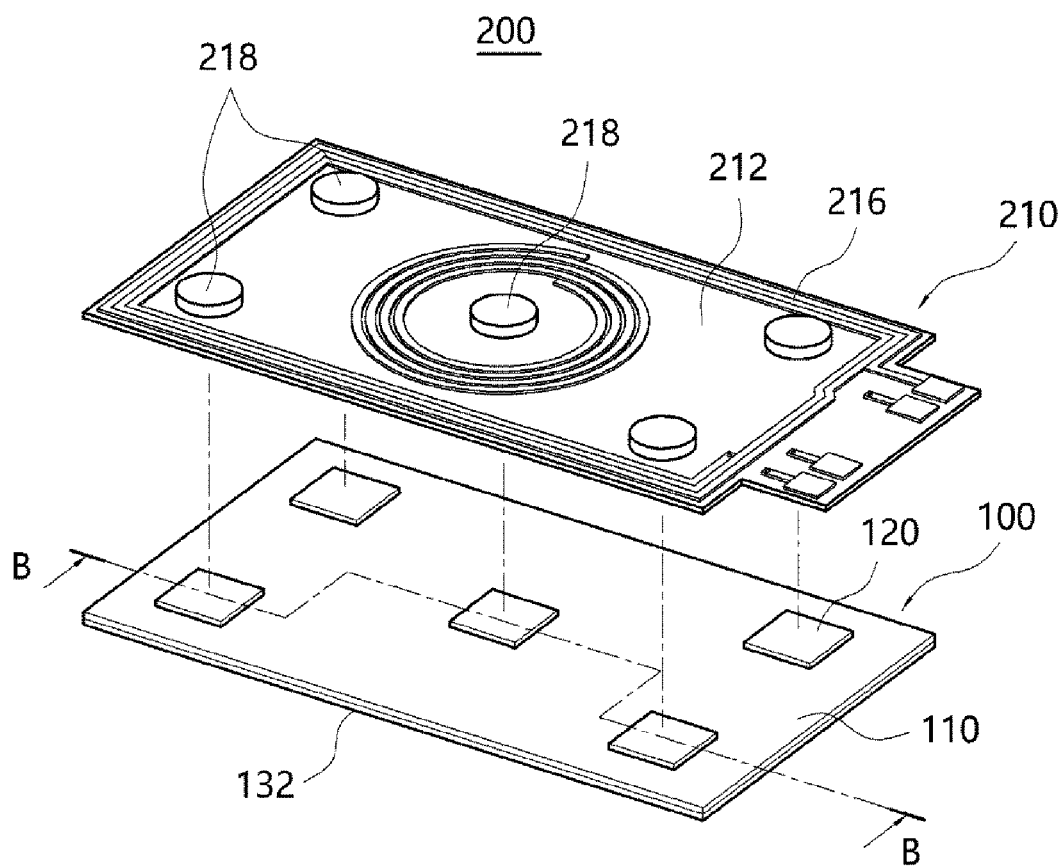
FIG. 4 is a view showing the antenna module according to one embodiment of the present invention.
Figure 5:
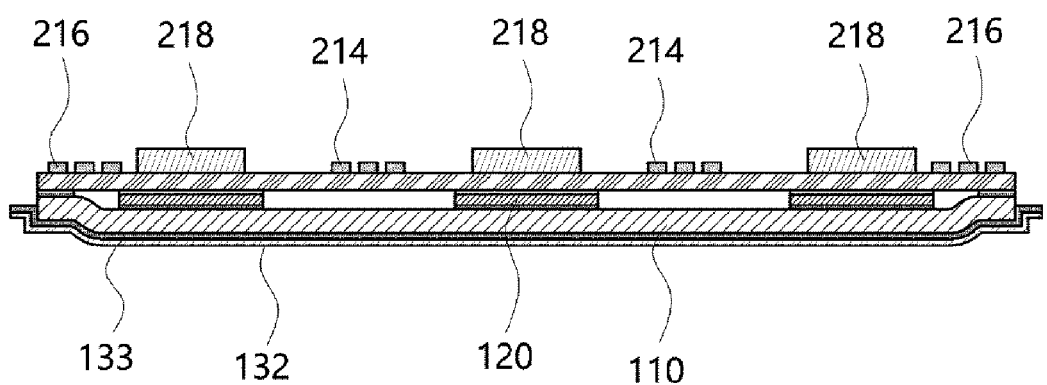
FIG. 5 is a cross-sectional view in the B-B direction of FIG. 4, showing a state in which the antenna unit and the magnetic field shielding sheet are combined.

Accordingly, as illustrated in FIGS. 4 and 5, when the magnetic field shielding sheet 100 according to one embodiment of the present invention constitutes an antenna module 200 together with an antenna unit 210 including a magnet 218 for position alignment, at least a part of the magnetic field of the DC magnetic field generated by the magnet 218 may be smoothly induced toward the magnetic saturation-prevention member 120, and the DC magnetic field induced through the magnetic saturation-prevention member 120 may form a closed loop in the antenna module 200 through the magnet 218 and the magnetic saturation-prevention member 120.

Through this, even if a DC magnetic field is generated in the magnet 218, at least a part of the DC magnetic field generated in the magnet 218 is induced toward the magnetic saturation-prevention member 120 such that it may be blocked from moving toward the main shielding sheet 110.

For this reason, the main shielding sheet 110 may prevent magnetic saturation due to the DC magnetic field generated by the magnet 218, thereby preventing performance degradation due to magnetic saturation.

In this case, the magnetic saturation-prevention member 120 may be made of a material having a saturation magnetic flux density of 1.2 Tesla or more such that the saturation by a DC magnetic field induced by the magnet 218 can be prevented while having a thin thickness t2.

For example, the magnetic saturation-prevention member 120 may be composed of a ribbon sheet 121 of an amorphous alloy or a nano-crystalline alloy, and it may be provided to have a thickness t2 of ½ or less with respect to the thickness t1 of the main shielding sheet 110.

Herein, when the magnetic saturation-prevention member 120 is composed of a ribbon sheet 121 of an amorphous alloy or a nano-crystalline alloy, the magnetic saturation-prevention member 120 may be composed of a single-layered ribbon sheet 121, but as illustrated in FIGS. 2 and 3, the magnetic saturation-prevention member 120 may be composed of a multi-layer sheet in which a plurality of ribbon sheets 121 are stacked via an adhesive layer 122. Moreover, the ribbon sheet 121 may be a sheet which is formed separately into a plurality of pieces.

Through this, even if the magnetic saturation-prevention member 120 is laminated on one surface of the main shielding sheet 110 in the magnetic field shielding sheet 100 according to one embodiment of the present invention, it is possible to prevent magnetic saturation of the main shielding sheet 110 due to the DC magnetic field generated from the magnet 218, while minimizing an increase in the total thickness of the magnetic field shielding sheet 100.

However, the material of the magnetic saturation-prevention member 120 is not limited thereto, and if the saturation magnetic flux density is 1.2 Tesla or more, various known materials may be applied without limitation.

The protective film 130 may be attached to the main shielding sheet 110 via an adhesive layer 133 so as to cover an exposed surface of the main shielding sheet 110.

For example, as illustrated in FIGS. 1 to 3, the protective film 130 may include a first protective film 131 which covers an upper surface of the main shielding sheet 110 and a second protective film 132 which covers a lower surface of the main shielding sheet 110.

In this case, the first protective film 131 may be attached to the upper surface of the main shielding sheet 110 so as to cover the exposed surface of the magnetic saturation-prevention member 120 which is laminated on the upper surface of the main shielding sheet 110 together with the upper surface of the main shielding sheet 110.

Through this, the main shielding sheet 110 and the magnetic saturation-prevention member 120 may be protected from external force by preventing external exposure through the protective film 130.

Further, in the magnetic field shielding sheet 100 for an antenna module according to one embodiment of the present invention, one surface of the main shielding sheet 110 and one surface of the magnetic saturation-prevention member 120 is simultaneously covered through the first protective film 13, and thus, the possibility that the magnetic saturation-prevention member 120 is separated from the main shielding sheet 110 may be significantly reduced.

Herein, when the magnetic field shielding sheet 100 for an antenna module according to one embodiment of the present invention constitutes the antenna module 200 together with the antenna units 210, 210', 210", any one of the first protective film 131 and the second protective film 132 may be removed such that the adhesive layer 133 is exposed to the outside so as to be attached to one surface of the antenna unit 210, 210', 210".

For example, when the magnetic field shielding sheet 100 for an antenna module according to one embodiment of the present invention constitutes the antenna module 200 together with the antenna units 210, 210', 210", the first protective film 131 may be removed, and one surface of the antenna units 210, 210', 210" may be attached to the upper surface of the main shielding sheet 110.

Through this, when the magnetic field shielding sheet 100 for an antenna module according to one embodiment of the present invention constitutes the antenna module 200 together with the antenna units 210, 210', 210", the magnetic saturation-prevention member 120 may be disposed to be positioned between one surface of the antenna units 210, 210', 210" and one surface of the main shielding sheet 110.

Accordingly, even if the first protective film 131 covering one surface of the main shielding sheet 110 and the magnetic saturation-prevention member 120 at the same time is removed, the magnetic saturation-prevention member 120 may be positioned and fixed between one surface of the antenna units 210, 210', 210" attached to each other and the main shield sheet 110, thereby maintaining the correct position.

In this case, the protective film 130 may cover the upper and lower surfaces of the main shielding sheet 110, respectively, but it may cover all exposed surfaces of the main shielding sheet 110 and the magnetic saturation-prevention member 120.

That is, the protective film 130 may be attached to the main shielding sheet 110 so as to surround the side surfaces of the main shielding sheet 110 together with the upper and lower surfaces of the main shielding sheet 110.

Specifically, as illustrated in FIGS. 2 and 3, the first protective film 131 may cover all of the upper surface and part of the side surface of the main shielding sheet 110 and the side surface and the upper surface of the magnetic saturation-prevention member 120, and the second protective film 132 may cover the lower surface of the main shielding sheet 110 and the side surface of the main shielding sheet 110 that is not covered by the first protective film 131.

Through this, the magnetic field shielding sheet 100 according to one embodiment of the present invention may be configured in a form where the main shielding sheet 110 and the magnetic saturation-prevention member 120 are sealed inside the protective film 130.

Accordingly, even if particles or powder are detached from the side surfaces of the main shielding sheet 110 and the magnetic saturation-prevention member 120, the detached particles or powder may be fundamentally blocked from moving to other parts such as the antenna units 210, 210', 210".

For this reason, even when the main shielding sheet 110 and/or the magnetic saturation-prevention member 120 is formed of a material including a metal component, the antenna units 210, 210', 210" may be fundamentally prevented from being electrically shorted by the detached particles or powder.

Moreover, even if the main shielding sheet 110 and/or the magnetic saturation-prevention member 120 is composed of a sheet that is separated into a plurality of pieces, it is possible to fundamentally prevent some pieces from escaping to the outside.

The above-described magnetic shielding sheet 100 for an antenna module according to one embodiment of the present invention may be implemented as an antenna module 200 together with antenna units 210, 210', 210" including an antenna 214 for wireless power transfer.

For example, as illustrated in FIGS. 4 and 5, the antenna module 200 may include an antenna unit 210 including at least one antenna 214, 216 which is formed in a pattern on at least one surface of the circuit board 212 and a magnet 218 for position alignment, and the above-described magnetic field shielding sheet 100 which is disposed on one surface of the antenna unit.

Herein, the antennas 214, 216 may be configured as any one of an antenna for wireless power transfer, an NFC antenna and an MST antenna, or they may be configured in a combo type including two or more of an antenna for wireless power transfer, an NFC antenna and an MST antenna.

Figure 7:
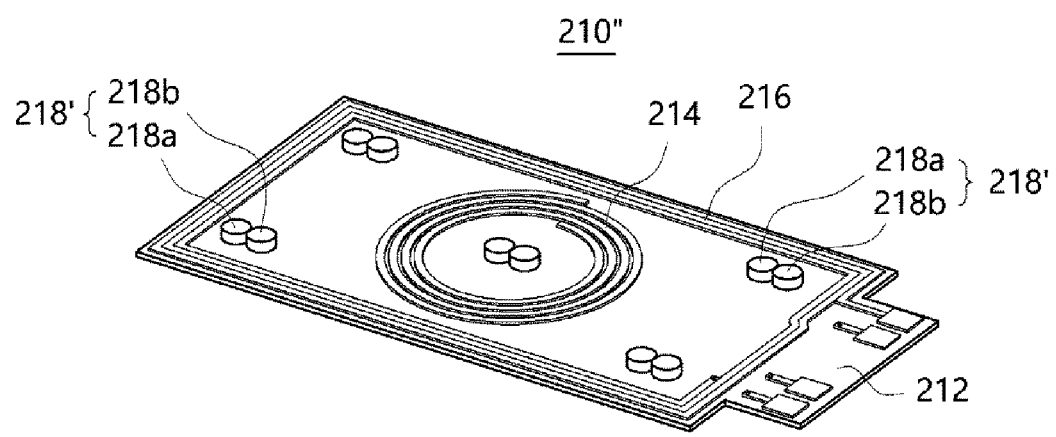
FIG. 7 is a view showing still another form of an antenna unit that can be applied to FIG. 4.

For example, as illustrated in FIGS. 4, 5 and 7, the antenna units 210, 210" may be configured to include a first antenna 214 and a second antenna 216 which are formed in a pattern on a circuit board 212, and at least one magnet 218, 218' which is disposed on one surface of the circuit board 212.

In this case, the first antenna 214 may be an antenna for wireless power transfer, and the second antenna 216 may be an NFC antenna, and the second antenna 216 may be formed on the circuit board 212 so as to surround the periphery of the first antenna 214.

Herein, the antenna for wireless power transfer may be an antenna for wireless power reception that receives wireless power from a wireless power transmission module, or an antenna for wireless power transmission that transmits wireless power to the antenna for wireless power reception. That is, when the antenna units 210, 210', 210" in the antenna module 200 include an antenna for wireless power transfer, the antenna module 200 may operate as a wireless power receiving module or a wireless power transmitting module depending on the role of the antenna for wireless power transfer.

Figure 6:
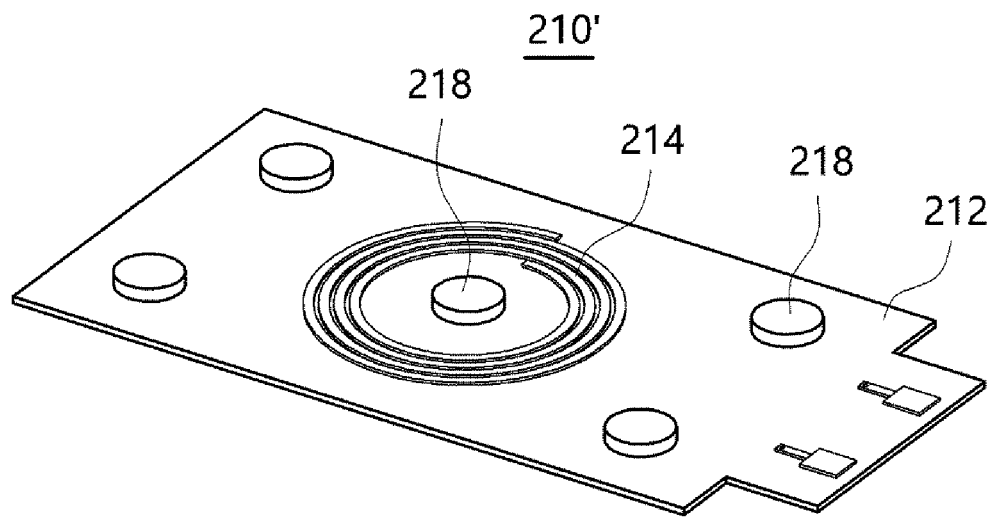
FIG. 6 is a view showing another form of an antenna unit that can be applied to FIG. 4.

As another example, as illustrated in FIG. 6, the antenna unit 210' may be configured to include a first antenna 214 which is formed in a pattern on the circuit board 212 and at least one magnet 218 which is disposed on one surface of the circuit board 212.

In this case, the first antenna 214 may perform any one function of an antenna for wireless power transfer, an NFC antenna and an MST antenna, and it may preferably perform a function of an antenna for wireless power transfer.

In this case, as described above, the magnetic field shielding sheet 100 may be attached to one surface of the circuit board 212 such that the magnetic saturation-prevention member 120 is disposed between the circuit board 212 and the main shielding sheet 110.

Further, in the magnetic field shielding sheet 100, the magnetic saturation-prevention member 120 may be provided to correspond one-to-one to at least one magnet 218 which is disposed on one surface of the circuit board 212.

That is, the magnetic saturation-prevention member 120 and the magnet 218 may be respectively disposed on both surfaces of the circuit board 212 constituting the antenna units 210, 210', 210", and the magnetic saturation-prevention member 120 may be disposed to be positioned directly under the magnet 218, and the magnetic saturation-prevention member 120 may be provided to have a larger cross-sectional area than the magnet 218.

Accordingly, at least a part of the magnetic field of the DC magnetic field generated by the magnet 218 may be smoothly induced toward the magnetic saturation-prevention member 120, and the DC magnetic field induced through the magnetic saturation-prevention member 120 may form a closed loop inside the antenna module 200 through the magnet 218 and the magnetic saturation-prevention member 120.

Through this, even if a DC magnetic field is generated in the magnet 218, at least a part of the DC magnetic field generated in the magnet 218 is induced toward the magnetic saturation-prevention member 120 such that it is blocked from moving toward the main shielding sheet 110.

For this reason, the main shielding sheet 110 may prevent magnetic saturation due to the DC magnetic field generated by the magnet 218, thereby preventing performance degradation due to magnetic saturation.

Meanwhile, in the antenna module 200 according to one embodiment of the present invention, at least one magnet 218' included in the antenna unit 210" may be provided as a pair having different polarities.

That is, as illustrated in FIG. 7, the antenna unit 210" may include at least one antenna 214, 216 which is formed in a pattern on the circuit board 212, and the magnet 218' which is disposed on one surface of the circuit board 212 may be provided in a pair having different polarities at respective positions corresponding to the magnetic saturation-prevention member 120.

For example, a pair of magnets 218' having different polarities may be a first magnet 218a having an N pole facing upward and a second magnet 218b having an S pole facing upward in FIG. 7.

Through this, when the antenna module 200 according to one embodiment of the present invention is aligned with other antenna module including a magnet for position alignment, the antenna module 200 according to one embodiment of the present invention may use any one of the magnets 218a, 218b among the first magnet 218a and the second magnet 218b having different polarities to be smoothly aligned with the other antenna module, regardless of the polarity of the magnet for position alignment which is provided in the other antenna module.

Although one embodiment of the present invention has been described above, the spirit of the present invention is not limited to the exemplary embodiments presented herein, and a person skilled in the art who understands the spirit of the present invention may easily suggest other exemplary embodiments by modifying, changing, deleting or adding components within the scope of the same spirit, but it can be said that this will also fall within the spirit of the present invention.

The invention claimed is:

1. A magnetic field shielding sheet for an antenna module which is applied to an antenna module comprising an antenna unit operating in a predetermined frequency band and a magnet for position alignment, comprising:
a main shielding sheet made of a magnetic material so as to shield a magnetic field generated from the antenna unit; and
at least one magnetic saturation-prevention member which is stacked on one side of the main shielding sheet so as to prevent magnetic saturation of the main shielding sheet by inducing a direct magnetic field generated from the magnet,
wherein the magnetic saturation-prevention member is provided in a number corresponding to the number of magnets provided in the antenna module and is disposed on one surface of the main shielding sheet so as to be positioned at a position corresponding to the magnets provided in the antenna module.

2. The magnetic field shielding sheet of claim 1, wherein the magnetic saturation-prevention member is provided to have a cross-sectional area which is larger than the cross-sectional area of the magnet.

3. The magnetic field shielding sheet of claim 1, wherein the thickness of the magnetic saturation-prevention member is provided to have a thickness of ½ or less with respect to the thickness of the main shielding sheet.

4. The magnetic field shielding sheet of claim 1, wherein the magnetic saturation-prevention member is made of a material having a saturation magnetic flux density of 1.2 Tesla or more.

5. The magnetic field shielding sheet of claim 4, wherein the magnetic saturation-prevention member is a ribbon sheet of an amorphous alloy or a nano-crystalline alloy.

6. The magnetic field shielding sheet of claim 5, wherein the magnetic saturation-prevention member is a multi-layer sheet in which the ribbon sheet is stacked in multiple layers.

7. The magnetic field shielding sheet of claim 1, wherein the magnetic field shielding sheet for an antenna module further comprises a first protective film and a second protective film which are attached to the main shielding sheet so as to surround an exposed surface of the main shielding sheet, and
wherein any one of the first protective film and the second protective film is attached to the main shielding sheet so as to surround one surface of the main shielding sheet and an exposed surface of the magnetic saturation-prevention member which is laminated on one surface of the main shielding sheet.

8. An antenna module, comprising:
an antenna unit comprising a circuit board, at least one antenna which is formed in a pattern on at least one surface of the circuit board and at least one magnet which is disposed on one surface of the circuit board; and
a magnetic field shielding sheet which is disposed on one surface of the antenna unit so as to shield a magnetic field generated from the at least one antenna,
wherein the magnetic field shielding sheet, comprising:
a main shielding sheet made of a magnetic material so as to shield a magnetic field generated from the antenna unit; and
at least one magnetic saturation-prevention member which is stacked on one side of the main shielding sheet so as to prevent magnetic saturation of the main shielding sheet by inducing a direct magnetic field generated from the magnet,
wherein the magnetic saturation-prevention member is provided in a number corresponding to the number of magnets provided in the antenna module and is disposed on one surface of the main shielding sheet so as to be positioned at a position corresponding to the magnets provided in the antenna module.

9. The antenna module of claim 8, wherein the antenna comprises at least one of an antenna for wireless power transfer, an NFC antenna and an MST antenna.

10. The antenna module of claim 8, wherein the magnetic field shielding sheet is attached to one surface of the circuit board such that the magnetic saturation-prevention member is disposed between the circuit board and the main shielding sheet.

11. The antenna module of claim 8, wherein the magnet is provided in a pair to have different polarities at positions corresponding to the magnetic saturation-prevention member.

12. The antenna module of claim 8, wherein the magnetic saturation-prevention member is provided to have a cross-sectional area which is larger than the cross-sectional area of the magnet.

13. The antenna module of claim 8, wherein the thickness of the magnetic saturation-prevention member is provided to have a thickness of ½ or less with respect to the thickness of the main shielding sheet.

14. The antenna module of claim 8, wherein the magnetic saturation-prevention member is made of a material having a saturation magnetic flux density of 1.2 Tesla or more.

15. The antenna module of claim 14, wherein the magnetic saturation-prevention member is a ribbon sheet of an amorphous alloy or a nano-crystalline alloy.

16. The antenna module of claim 15, wherein the magnetic saturation-prevention member is a multi-layer sheet in which the ribbon sheet is stacked in multiple layers.

17. The antenna module of claim 8, wherein the magnetic field shielding sheet for an antenna module further comprises a first protective film and a second protective film which are attached to the main shielding sheet so as to surround an exposed surface of the main shielding sheet, and
wherein any one of the first protective film and the second protective film is attached to the main shielding sheet so as to surround one surface of the main shielding sheet and an exposed surface of the magnetic saturation-prevention member which is laminated on one surface of the main shielding sheet.

* * * * *